(12) United States Patent
Choi et al.

(10) Patent No.: US 12,023,221 B2
(45) Date of Patent: Jul. 2, 2024

(54) AUTOMATED METHOD FOR ALIGNING 3D DENTAL DATA AND COMPUTER READABLE MEDIUM HAVING PROGRAM FOR PERFORMING THE METHOD

(71) Applicant: IMAGOWORKS INC., Seoul (KR)

(72) Inventors: Jinhyeok Choi, Seoul (KR); Hannah Kim, Seoul (KR); Tae-geun Son, Seoul (KR); Youngjun Kim, Seoul (KR)

(73) Assignee: IMAGOWORKS INC., Seoul (KR)

( * ) Notice: Subject to any disclaimer, the term of this patent is extended or adjusted under 35 U.S.C. 154(b) by 350 days.

(21) Appl. No.: 17/395,954

(22) Filed: Aug. 6, 2021

(65) Prior Publication Data

US 2022/0054237 A1 Feb. 24, 2022

(30) Foreign Application Priority Data

Aug. 20, 2020 (KR) .................. 10-2020-0104934
Sep. 11, 2020 (WO) ............. PCT/KR2020/012342
(Continued)

(51) Int. Cl.
*A61C 9/00* (2006.01)
*G06T 7/00* (2017.01)
*G06T 11/20* (2006.01)

(52) U.S. Cl.
CPC .......... *A61C 9/0053* (2013.01); *G06T 7/0012* (2013.01); *G06T 11/203* (2013.01);
(Continued)

(58) Field of Classification Search
CPC ... A61C 9/0053; G06T 7/0012; G06T 11/203; G06T 2207/10081; G06T 2207/20101;
(Continued)

(56) References Cited

U.S. PATENT DOCUMENTS 10,438,363 B2 10/2019 Kim et al.
2022/0122264 A1* 4/2022 Reynard ................ A61B 6/032

FOREIGN PATENT DOCUMENTS

EP 3673864 A 7/2020
JP 2008229322 A 10/2008
(Continued)

OTHER PUBLICATIONS

Chang YB, Xia JJ, Gateno J, Xiong Z, Zhou X, Wong ST. An automatic and robust algorithm of reestablishment of digital dental occlusion. IEEE Trans Med Imaging. Sep. 2010;29(9):1652-63. (Year: 2010).*

(Continued)

*Primary Examiner* — Umair Ahsan
(74) *Attorney, Agent, or Firm* — LEEPI

(57) ABSTRACT

An automated method for aligning 3D (three-dimensional) dental data includes extracting landmark points of a CT (computerized tomography) data, extracting landmark points of scan data of a digital impression model, determining an up vector representing a direction of a patient's eyes and nose and identifying left and right of the landmark points of the scan data, extracting a teeth portion of the scan data, searching a source point of the scan data on a spline curve of the CT data to generate a candidate target point group and determining the candidate target point group having a smallest error with the landmark points of the CT data as a final candidate.

22 Claims, 15 Drawing Sheets

| (30) | Foreign Application Priority Data | | |
|---|---|---|---|

Sep. 14, 2020 (KR) .................. 10-2020-0117978
Sep. 22, 2020 (WO) ............... PCT/KR2020/012762

(52) U.S. Cl.
CPC ............ *G06T 2207/10081* (2013.01); *G06T 2207/20101* (2013.01); *G06T 2207/30036* (2013.01)

(58) Field of Classification Search
CPC ... G06T 2207/30036; G06T 7/30; A61B 6/14; A61B 6/52
See application file for complete search history.

(56) References Cited

FOREIGN PATENT DOCUMENTS

| KR | 101292811 B1 * | 8/2013 |
| KR | 10-1613159 B1 | 4/2016 |
| KR | 10-1666050 B1 | 10/2016 |
| KR | 10-2018-0088061 A | 8/2018 |
| KR | 10-2018-0101871 A | 9/2018 |
| KR | 10-2018-0125793 A | 11/2018 |
| KR | 10-1913586 B1 | 11/2018 |
| KR | 10-1953622 B1 | 5/2019 |
| KR | 10-2020-0006506 A | 1/2020 |
| KR | 10-2020-0075623 A | 6/2020 |
| WO | 2020136243 A | 7/2020 |

OTHER PUBLICATIONS

International search report dated Jun. 11, 2021 for PCT/KR2020/012342.
International search report dated Jun. 10, 2021 for PCT/KR2020/012762.
European search report dated Jan. 21, 2022.
IEEE Transactions on medical imaging, vol. 29, No. 9, Sep. 2010.
Japanese patent application Office Action dated Dec. 11, 2023.

* cited by examiner

AUTOMATED METHOD FOR ALIGNING 3D DENTAL DATA AND COMPUTER READABLE MEDIUM HAVING PROGRAM FOR PERFORMING THE METHOD

PRIORITY STATEMENT

This application claims priority under 35 U.S.C. § 119 to Korean Patent Application No. 10-2020-0104934, filed on Aug. 20, 2020 and Korean Patent Application No. 10-2020-0117978, filed on Sep. 14, 2020 in the Korean Intellectual Property Office (KIPO), International Patent Application No. PCT/KR2020/012342 filed on Sep. 11, 2020 and International Patent Application No. PCT/KR2020/012762 filed on Sep. 22, 2020, the contents of which are herein incorporated by reference in their entireties.

BACKGROUND

1. Technical Field

Embodiments relate to an automated method for aligning 3D (three-dimensional) dental data and a non-transitory computer-readable storage medium having stored thereon program instructions of the automated method for aligning 3D dental data. More particularly embodiments relate to an automated method for aligning 3D dental data reducing time and effort for registration of a dental CT (computerized tomography) image and a digital impression model and a non-transitory computer-readable storage medium having stored thereon program instructions of the automated method for aligning 3D dental data.

2. Description of the Related Art

In dental clinics, 3D patient medical image data and 3D digital impression model scan data are used for diagnosis, analysis, and prosthesis production. The two data have different information, and when combined into one, it is more effective and various diagnosis, analysis, and production are possible. However, since the two data are 3D data defined in different coordinate systems, a registration process to match the two data is required.

For registration of the 3D patient medical image data and the 3D digital impression model scan data, landmark points may be set in each of the 3D patient medical image data and the 3D digital impression model scan data.

Selecting six landmark points from two 3D data which are the dental CT image and the digital impression model may take a lot of time and effort. In addition, even if the landmark points are found using an artificial intelligence technology, the found landmark points may not exactly match each other. In addition, when there is a missing tooth or when data areas of the two data are different from each other, a result of an initial registration may not be good by only the landmark points.

SUMMARY

Embodiments provide an automated method for aligning 3D dental data capable of reducing time and effort for registration of a dental CT image and a digital impression model.

Embodiments provide a non-transitory computer-readable storage medium having stored thereon program instructions of the automated method for aligning 3D dental data.

In an example automated method for aligning 3D dental data according to the present inventive concept, the method includes extracting landmark points of a CT (computerized tomography) data, extracting landmark points of scan data of a digital impression model, determining an up vector representing a direction of a patient's eyes and nose and identifying left and right of the landmark points of the scan data, extracting a teeth portion of the scan data, searching a source point of the scan data on a spline curve of the CT data to generate a candidate target point group and determining the candidate target point group having a smallest error with the landmark points of the CT data as a final candidate.

In an embodiment, the landmark points of the CT data may include three or more landmark points in a maxilla and three or more landmark points in a mandible. The landmark points of the scan data may include three landmark points.

In an embodiment, a first landmark point and a third landmark point of the scan data may indicate outermost points of teeth of the scan data in a lateral direction.

In an embodiment, when a first landmark point of the scan data is $p_{11}$, a second landmark point of the scan data is $p_{12}$, a third landmark point of the scan data is $p_{13}$ and an average vector obtained by averaging all normal vectors from all points forming meshes of the scan data is $\vec{v_n}$, the left and the right of the landmark points of the scan data may be identified using a cross product of $\overrightarrow{p_{11}-p_{12}}$ and $\overrightarrow{p_{13}-p_{12}}$ and the average vector $\vec{v_n}$.

In an embodiment, when the scan data represent maxilla data and a discriminant d<0, a left teeth landmark point $p_L$ representing a left outermost point of teeth of the patient may be $p_{11}$ and a right teeth landmark point $p_R$ representing a right outermost point of the teeth of the patient may be $p_{13}$. When the scan data represent the maxilla data and the discriminant d>=0, the left teeth landmark point $p_L$ may be $p_{13}$ and the right teeth landmark point $p_R$ may be $p_{11}$. The discriminant d may be defined as $$d = \vec{v_n} \cdot \left\{ \left( \frac{\overrightarrow{p_{11}-p_{12}}}{\|\overrightarrow{p_{11}-p_{12}}\|} \right) \times \left( \frac{\overrightarrow{p_{13}-p_{12}}}{\|\overrightarrow{p_{13}-p_{12}}\|} \right) \right\}.$$

In an embodiment, when the scan data represent a mandible data and the discriminant d<0, the left teeth landmark point $p_L$ may be $p_{13}$ and the right teeth landmark point $p_R$ may be $p_{11}$. When the scan data represent the mandible data and the discriminant d>=0, the left teeth landmark point $p_L$ may be $p_{11}$ and the right teeth landmark point $p_R$ may be $p_{13}$.

In an embodiment, when the up vector is $\vec{v_S}$, a left teeth landmark point representing a left outermost point of a teeth of the patient is $p_L$, a right teeth landmark point representing a right outermost point of the teeth of the patient is $p_R$, a second landmark point of the scan data is $p_{12}$, and the scan data represent the maxilla data, $$\vec{v_S} = \left( \frac{\overrightarrow{p_R-p_{12}}}{\|\overrightarrow{p_R-p_{12}}\|} \right) \times \left( \frac{\overrightarrow{p_L-p_{12}}}{\|\overrightarrow{p_L-p_{12}}\|} \right).$$

In an embodiment, when the up vector is $\vec{v_S}$, a left teeth landmark point representing a left outermost point of a teeth of the patient is $p_L$, a right teeth landmark point representing a right outermost point of the teeth of the patient is $p_R$, a second landmark point of the scan data is $p_{12}$ and the scan data represent the mandible data, $$\vec{v_S} = \left(\frac{\vec{p_L - p_{12}}}{\|\vec{p_L - p_{12}}\|}\right) \times \left(\frac{\vec{p_R - p_{12}}}{\|\vec{p_R - p_{12}}\|}\right).$$

In an embodiment, the method may further include determining whether the CT data and the scan data have a same area. When $d_1=\|p_1-p_3\|$, $d_2=\|p_3-p_5\|$, $d_3=\|p_{11}-p_{12}\|$, $d_4=\|p_{13}-p_{12}\|$, th is a first threshold value for determining that the CT data and the scan data have the same area, p1, p3 and p5 are the landmark points of the CT data, $p_{11}$, $p_{12}$ and $p_{13}$ are the landmark points of the scan data and $\|(d_1+d_2)-(d_3+d_4))\|$<th is satisfied, the CT data and the scan data are determined to have the same area.

In an embodiment, the extracting the teeth portion of the scan data may include extracting a highest point among a first landmark point, a second landmark point and a third landmark point of the scan data in a direction of the up vector when the scan data represent maxilla data, cutting the scan data into a plane having a normal vector of the up vector at a point moved from the highest point by a first distance in a positive direction of the up vector and cutting the scan data into a plane having a normal vector of the up vector at a point moved from the highest point by a second distance in a negative direction of the up vector.

In an embodiment, the extracting the teeth portion of the scan data may further include extracting a lowest point among the first landmark point, the second landmark point and the third landmark point of the scan data in the direction of the up vector when the scan data represent mandible data, cutting the scan data into a plane having a normal vector of the up vector at a point moved from the lowest point by the first distance in a positive direction of the up vector and cutting the scan data into a plane having a normal vector of the up vector at a point moved from the lowest point by the second distance in a negative direction of the up vector.

In an embodiment, a vector from the second landmark point of the scan data to a right teeth landmark point may be defined as $\vec{v_R}$ and a vector from the second landmark point to a left teeth landmark point may be defined as $\vec{v_L}$. The extracting the teeth portion of the scan data may further include cutting the scan data into a plane having a normal vector of $\vec{v_R}$ at a point moved from the right teeth landmark point by a third distance in the direction of $\vec{v_R}$ and cutting the scan data into a plane having a normal vector of $\vec{v_L}$ at a point moved from the left teeth landmark point by the third distance in the direction of $\vec{v_L}$.

In an embodiment, an absolute value of the third distance may be less than an absolute value of the first distance and an absolute value of the second distance.

In an embodiment, a first vector is defined as a vector rotated by −90 degrees from the vector $\vec{v_R}$, a second vector is defined as a vector rotated by +90 degrees from the vector $\vec{v_R}$, a third vector is defined as a vector rotated by +90 degrees from the vector $\vec{v_L}$, a fourth vector is defined as a vector rotated by −90 degrees from the vector $\vec{v_L}$. The extracting the teeth portion of the scan data may further include cutting the scan data into a plane having a normal vector of the first vector at a point moved from the right teeth landmark point by the third distance in the direction of $\vec{v_R}$ and by a fourth distance in the direction of the first vector, cutting the scan data into a plane having a normal vector of the second vector at a point moved from the right teeth landmark point by the third distance in the direction of $\vec{v_R}$ and by the fourth distance in the direction of the second vector, cutting the scan data into a plane having a normal vector of the third vector at a point moved from the left teeth landmark point by the third distance in the direction of $\vec{v_L}$ and by the fourth distance in the direction of the third vector and cutting the scan data into a plane having a normal vector of the fourth vector at a point moved from the left teeth landmark point by the third distance in the direction of $\vec{v_L}$ and by the fourth distance in the direction of the fourth vector.

In an embodiment, an absolute value of the fourth distance may be greater than an absolute value of the first distance, an absolute value of the second distance and an absolute value of the third distance.

In an embodiment, the extracting the teeth portion of the scan data may further include cutting the scan data into a plane having a normal vector of a vector of $\vec{v_M}$ which is a sum of $\vec{v_L}$ and $\vec{v_R}$ at a point moved from the second landmark point by a fifth distance in the direction of $\vec{v_M}$ and cutting the scan data into a plane having a normal vector of a vector of $-\vec{v_M}$ at a point moved from the second landmark point by the fifth distance in the direction of $-\vec{v_M}$.

In an embodiment, the searching the source point of the scan data on the spline curve of the CT data may include calculating the spline curve C(u) based on a plurality of landmark points of a maxilla of the CT data or a plurality of landmark points of a mandible of the CT data.

In an embodiment, the source point may include three points of a left teeth landmark point, a second landmark point and a right teeth landmark point.

In an embodiment, $p_L$ may be the left teeth landmark point, $p_{12}$ may be the second landmark point, and $p_R$ may be the right teeth landmark point. A first point C(u1) of a target point may be searched on C(u) while increasing a parameter u by a first value. A second point C(u2) of the target point may be searched on C(u) while increasing the parameter u by a second value. The second point C(u2) of the target point may be a point minimizing the d11=$\|C(u1)-C(u2)\|-\|p_L-p_{12}\|$. A third point C(u3) of the target point may be searched on C(u) while increasing the parameter u by a third value. The third point C(u3) of the target point may be a point minimizing the d12=$\|C(u2)-C(u3)\|-p_{12}-p_R\|$. When all of d11, d12 and d13=$\|C(u3)-C(u1)\|-\|p_R-p_L\|$ are less than a second threshold value, the target points C(u1), C(u2) and C(u3) may be selected as the candidate target point group. The target point group may include three points of C(u1), C(u2) and C(u3).

In an embodiment, the determining the candidate target point group having the smallest error with the landmark points of the CT data as the final candidate may include transforming the candidate target point group to a domain of the CT data using a transform matrix and calculating a transform error as an average of distances between the transformed candidate target point group and the landmark points of the CT data.

In an example method of automated method for aligning 3D dental data according to the present inventive concept, the method includes extracting landmark points of a CT (computerized tomography) data, extracting landmark points of scan data of a digital impression model, determining an up vector representing a direction of a patient's eyes and nose and identifying left and right of the landmark points of the scan data, determining whether the CT data and the scan data have a same area, extracting a teeth portion of the scan data, searching a source point of the scan data on a spline curve of the CT data to generate a candidate target point group when the CT data and the scan data have different areas and recommending a candidate target point group having a smallest error of a registration of the CT data and the scan data among the plural candidate target point groups as a final candidate.

In an example non-transitory computer-readable storage medium having stored thereon at least one program commands, the program commands are executable by at least one hardware processor to extract landmark points of a CT data, extract landmark points of scan data of a digital impression model, determine an up vector representing a direction of a patient's eyes and nose and identify left and right of the landmark points of the scan data, extract a teeth portion of the scan data, search a source point of the scan data on a spline curve of the CT data to generate a candidate target point group and determine the candidate target point group having a smallest error with the landmark points of the CT data as a final candidate.

In an example non-transitory computer-readable storage medium having stored thereon at least one program commands, the program commands are executable by at least one hardware processor to extract landmark points of a CT (computerized tomography) data, extract landmark points of scan data of a digital impression model, determine an up vector representing a direction of a patient's eyes and nose and identify left and right of the landmark points of the scan data, determine whether the CT data and the scan data have a same area, extract a teeth portion of the scan data, search a source point of the scan data on a spline curve of the CT data to generate a candidate target point group when the CT data and the scan data have different areas and recommend a candidate target point group having a smallest error of a registration of the CT data and the scan data among the plural candidate target point groups as a final candidate.

According to the automated method for aligning 3D dental data, even if there is no user input and the data areas are different, a good initial registration result may be obtained. Accordingly, a result of a fine registration may be quickly obtained without a user input.

According to the automated method for aligning 3D dental data, the time and effort for registration of the patient medical image data (CT or CBCT) and the digital impression model scan data, which is frequently performed for diagnosis, analysis and prosthesis production in dental clinics and dental laboratories, may be dramatically reduced.

BRIEF DESCRIPTION OF THE DRAWINGS

The above and other features and advantages of the present inventive concept will become more apparent by describing in detailed embodiments thereof with reference to the accompanying drawings, in which.

DETAILED DESCRIPTION OF THE EMBODIMENTS

Figure 1:
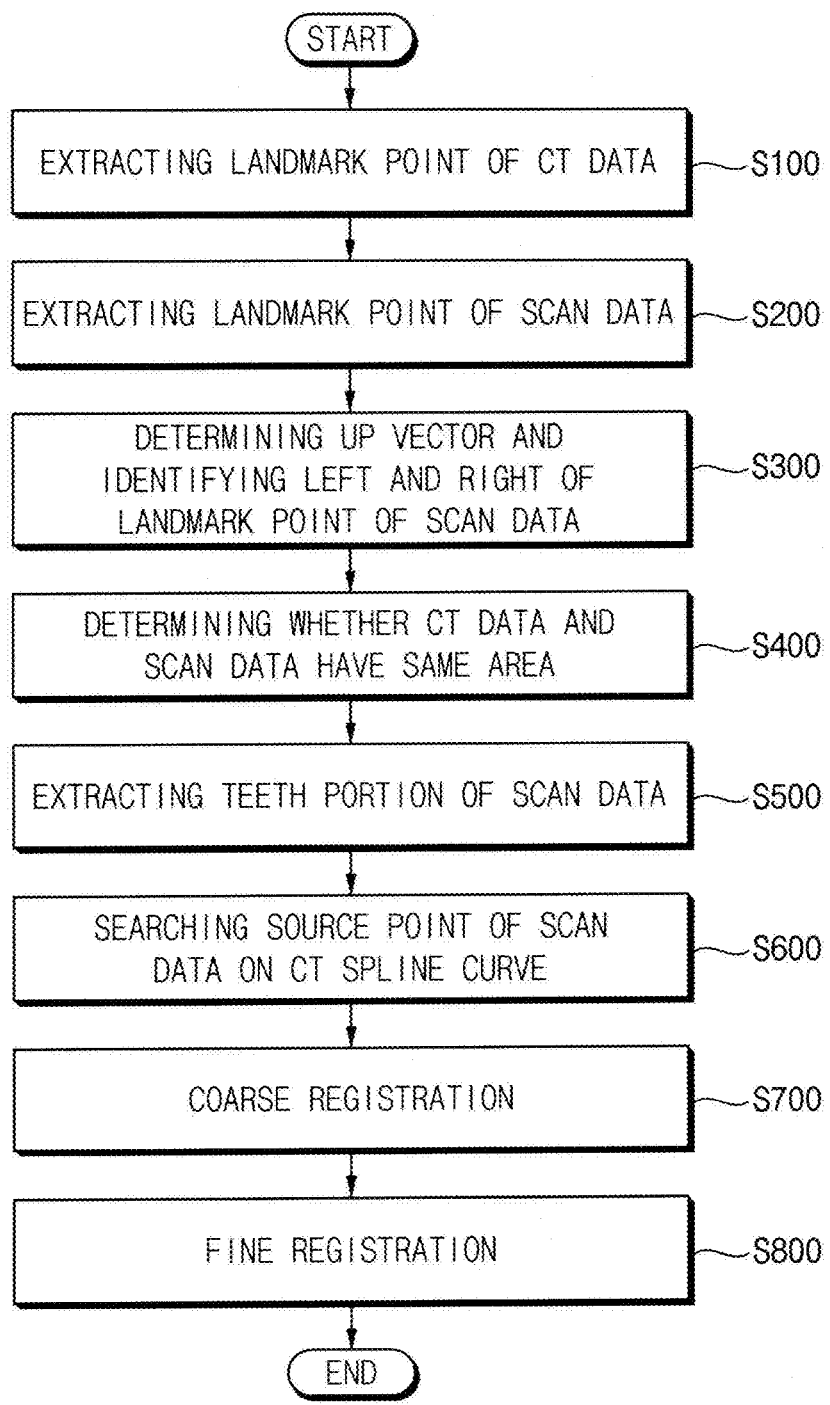
FIG. 1 is a flowchart diagram illustrating an automated method for registration of a dental CT (computerized tomography) image and a digital impression model according to an embodiment of the present inventive concept.

The present inventive concept now will be described more fully hereinafter with reference to the accompanying drawings, in which exemplary embodiments of the present invention are shown. The present inventive concept may, however, be embodied in many different forms and should not be construed as limited to the exemplary embodiments set fourth herein.

Rather, these exemplary embodiments are provided so that this disclosure will be thorough and complete, and will fully convey the scope of the present invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the inventive concept as used herein.

Hereinafter, the present inventive concept will be explained in detail with reference to the accompanying drawings.

Figure 2:
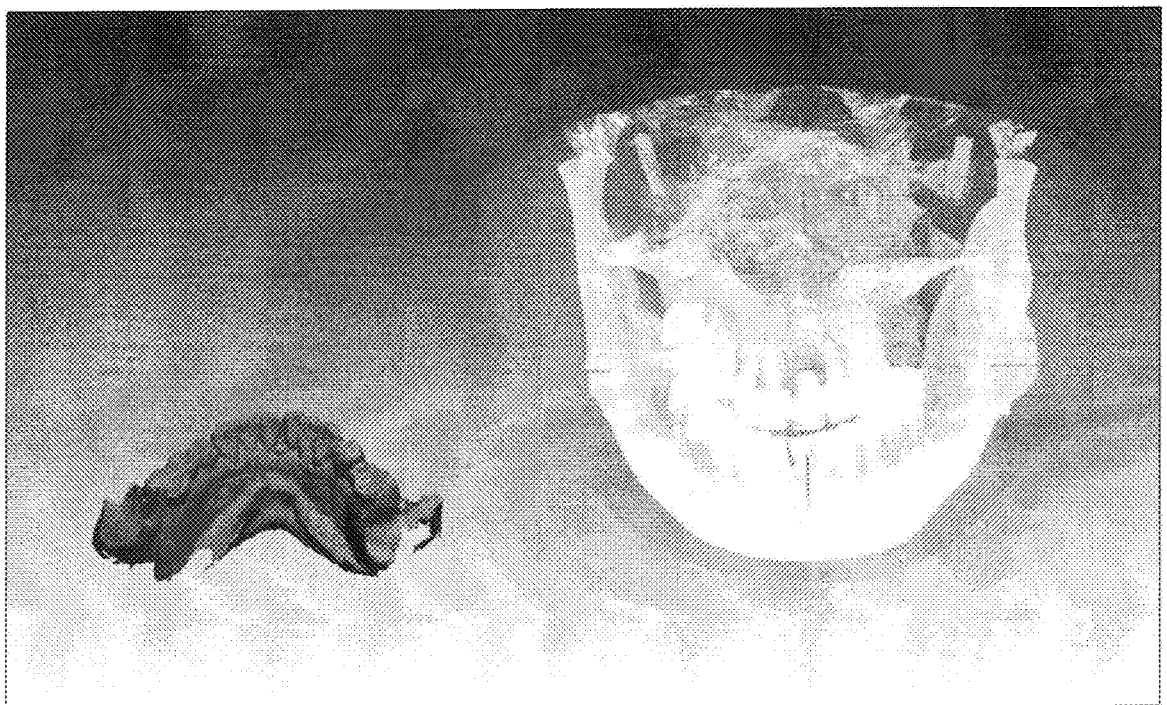
FIG. 2 illustrates the dental CT image and a scan data of the digital impression model.
Figure 3:
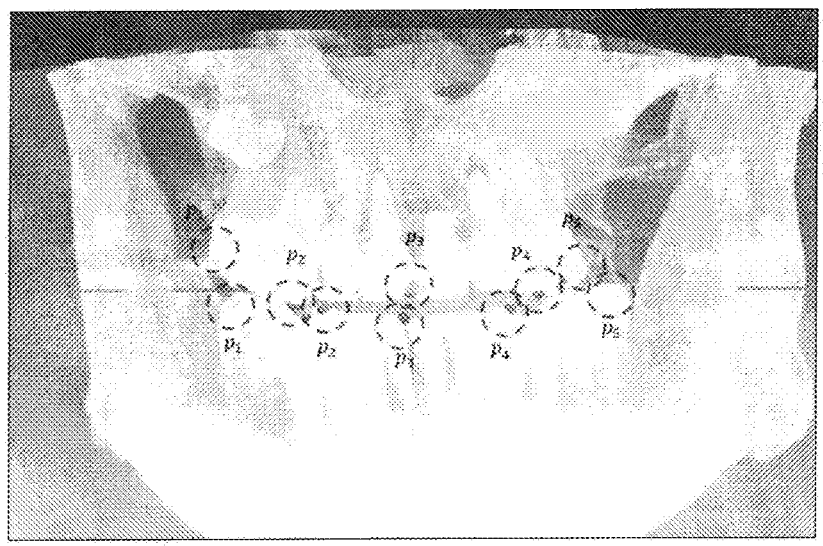
FIG. 3 illustrates landmark points of the dental CT image.
Figure 4:
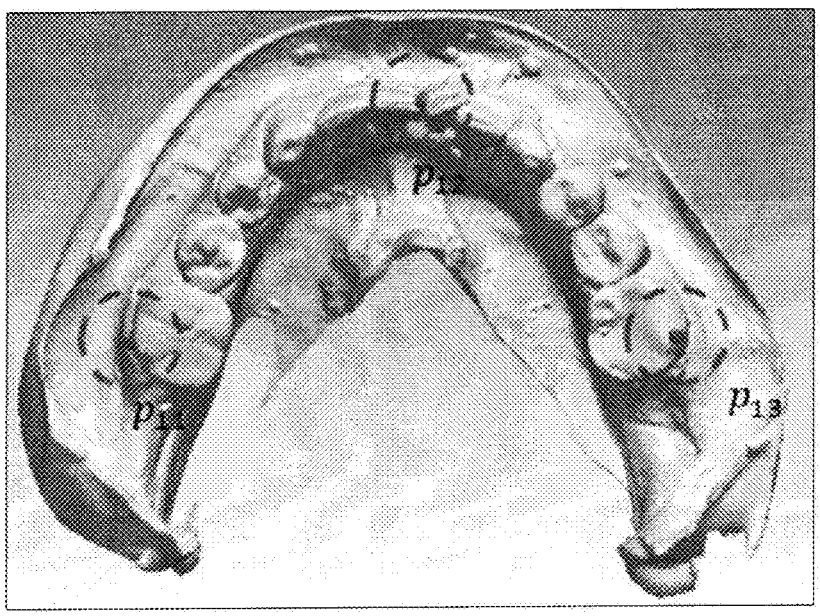
FIG. 4 illustrates landmark points of the scan data of the digital impression model.

FIG. 1 is a flowchart diagram illustrating an automated method for registration of a dental CT (computerized tomography) image and a digital impression model according to an embodiment of the present inventive concept. FIG. 2 illustrates the dental CT image and a scan data of the digital impression model. FIG. 3 illustrates landmark points of the dental CT image. FIG. 4 illustrates landmark points of the scan data of the digital impression model.

Referring to FIGS. 1 to 4, for the registration of the dental CT image and the digital impression image, the landmark points of the dental CT image may be extracted (step S100) and the landmark points of the digital impression image may be extracted (step S200).

For example, the dental CT image may be a cone beam CT (CBCT) image. The dental CT image may include teeth, bones and neural tubes. For example, the scan data of the digital impression model may be obtained by scanning an inside of a patient's mouth with a scanner. For example, the scan data may be obtained by scanning a plaster model of an inside of a patient's mouth with a scanner.

A left image of FIG. 2 may be the scan data of the digital impression model. A right image of FIG. 2 may be the dental CT image. In the present embodiment, the digital impression model may correspond to one of the maxilla and the mandible of the patient. In the present embodiment, the dental CT image may include information of both of the maxilla and the mandible of the patient.

For example, in FIG. 3, the landmark points of the dental CT image may indicate specific positions of the teeth. For example, the landmark points of the dental CT image may include three or more landmark points in the maxilla and three or more landmark points in the mandible. The landmark points of the dental CT image may include five landmark points p1, p2, p3, p4 and p5 in the maxilla and five landmark points p6, p7, p8, p9 and p10 in the mandible. For example, a first landmark point p1 of the maxilla and a fifth landmark point p5 of the maxilla may indicate outermost points of the teeth of the maxilla in a lateral direction. A third landmark point p3 of the maxilla may indicate between two maxillary central incisors. A second landmark point p2 of the maxilla may be disposed between the first landmark point p1 and the third land mark point p3. A fourth landmark point p4 of the maxilla may be disposed between the third landmark point p3 and the fifth land mark point p5. For example, a sixth landmark point p6 of the mandible and a tenth landmark point p10 of the mandible may indicate outermost points of the teeth of the mandible in the lateral direction. An eighth landmark point p8 of the mandible may indicate between two mandibular central incisors. A seventh landmark point p7 of the mandible may be disposed between the sixth landmark point p6 and the eighth land mark point p8. A ninth landmark point p9 of the mandible may be disposed between the eighth landmark point p8 and the tenth land mark point p10.

For example, in FIG. 4, the landmark points of the scan data may indicate specific positions of the teeth. The landmark points of the scan data may include three landmark points $p_{11}$, $p_{12}$ and $p_{13}$. Herein, the scan data may represent the maxilla of the patient or the mandible of the patient. For example, a first landmark point $p_{11}$ and a third landmark point $p_{13}$ of the scan data may indicate outermost points of the teeth of the scan data in the lateral direction. The second landmark point $p_{12}$ of the scan data may indicate between two central incisors.

In the present embodiment, the landmark points (e.g. p1 to p10) of the CT image may be automatically extracted using an artificial intelligence deep learning method. In addition, the landmark points (e.g. $p_{11}$ to $p_{13}$) of the scan data may be automatically extracted using an artificial intelligence deep learning method. Whether the scan data represent the maxilla or the mandible may be determined by a user's input or may be automatically determined using additional information of the scan data.

FIGS. 5 to 8 illustrate a method of determining an up vector and a method of identifying left and right of the landmark points of the scan data.

The method of determining the up vector $\vec{v_S}$ representing an upward direction of the scan data (the direction of the patient's eyes and nose) and the method of identifying left and right of the landmark points $p_{11}$ to $p_{13}$ of the scan data are explained referring to FIGS. 5 to 8 (step S300).

Figure 5:
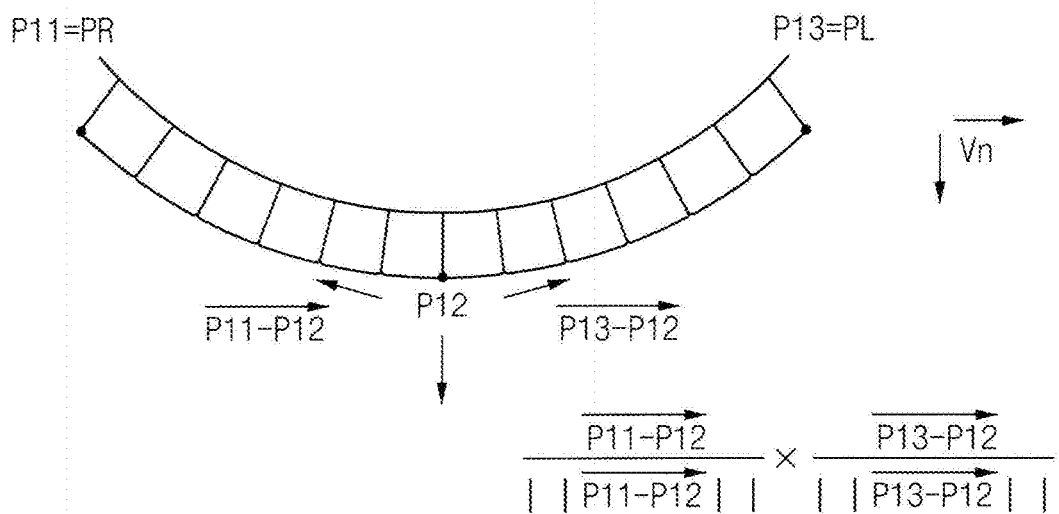
FIGS. 5 to 8 illustrate a method of determining an up vector and a method of identifying left and right of the landmark points of the scan data.

For example, in FIG. 5, teeth are protruded downward in the scan data, a first landmark point $p_{11}$ is disposed in a left portion of the scan data and a third landmark point is disposed in a right portion of the scan data. Even if the teeth of the scan data of FIG. 5 are protruded downward, the scan data of FIG. 5 does not necessarily mean the maxilla data. As explained above, whether the scan data represent the maxilla or the mandible may be determined by the user's input or using additional information of the scan data.

Normal vectors may be obtained from all points (all points on the surface of the scan data) forming meshes of the scan data of FIG. 5. A unit vector $\vec{v_n}$ of an average vector obtained by averaging all the normal vectors from all the points. The average vector obtained by averaging all the normal vectors from all the points may point downward in FIG. 5. The unit vector $\vec{v_n}$ of the average vector may have a unit length in the downward direction.

Discriminant for identifying the left and the right of the landmark points of the scan data is shown in following Equation 1.

$$d = \vec{v_n} \cdot \left\{ \left( \frac{\vec{p_{11} - p_{12}}}{\|p_{11} - p_{12}\|} \right) \times \left( \frac{\vec{p_{13} - p_{12}}}{\|p_{13} - p_{12}\|} \right) \right\} \quad \text{[Equation 1]}$$

When the scan data represent the maxilla data and the discriminant d<0, a left teeth landmark point $p_L$ representing a left outermost point of the teeth of the patient may be $p_{11}$ and a right teeth landmark point representing a right outermost point of the teeth of the patient may be $p_{13}$. In contrast, when the scan data represent the maxilla data and the discriminant d>=0, the left teeth landmark point $p_L$ may be $p_{13}$ and the right teeth landmark point $p_R$ may be $p_{11}$.

When the scan data represent the mandible data and the discriminant d<0, a left teeth landmark point $p_L$ representing a left outermost point of the teeth of the patient may be $p_{13}$ and a right teeth landmark point $p_R$ representing a right outermost point of the teeth of the patient may be $p_{11}$. In contrast, when the scan data represent the mandible data and the discriminant d>=0, the left teeth landmark point $p_L$ may be and the right teeth landmark point $p_R$ may be $p_{13}$.

In FIG. 5, since $v_n$ has the downward direction, $v_n=-1$ when an upward direction is supposed to a positive direction. A cross product $\overrightarrow{p_{11}-p_{12}} \times \overrightarrow{p_{13}-p_{12}}$ of $\overrightarrow{p_{11}-p_{12}}$ and $\overrightarrow{p_{13}-p_{12}}$ may have the downward direction (a negative value). Thus, d is equal to or greater than zero (d>=0) by Equation 1 so that the left landmark point $p_L=p_{13}$ and the right teeth landmark point $p_R=p_{11}$ when the scan data in FIG. 5 represent the maxilla data. In contrast, d is equal to or greater than zero (d>=0) by Equation 1 so that the left landmark point and the right teeth landmark point $p_R=p_{13}$ when the scan data in FIG. 5 represent the mandible data.

Figure 6:
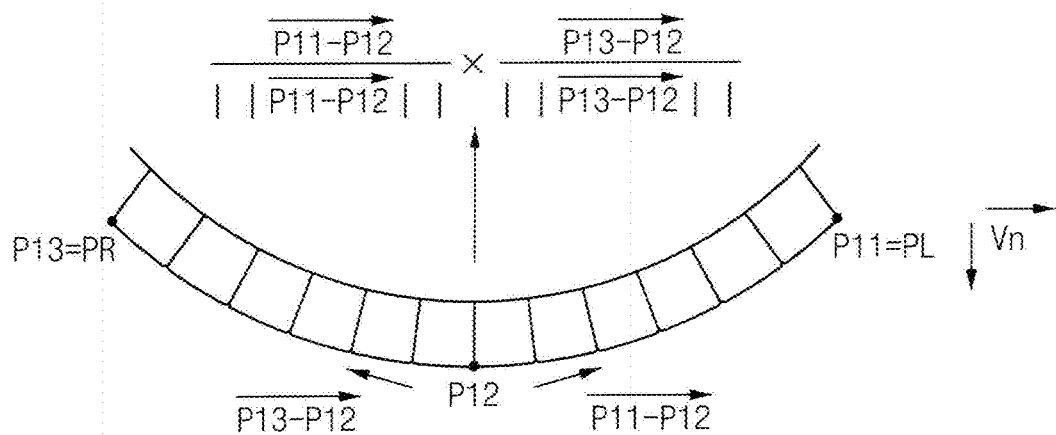

For example, in FIG. 6, teeth are protruded downward in the scan data, a third landmark point $p_{13}$ is disposed in a left portion of the scan data and a first landmark point $p_{11}$ is disposed in a right portion of the scan data.

In FIG. 6, since $\vec{v}_n$ has the downward direction, $\vec{v}_n=-1$ when the upward direction is supposed to the positive direction. The cross product $\overrightarrow{p_{11}-p_{12}} \times \overrightarrow{p_{13}-p_{12}}$ of $\overrightarrow{p_{11}-p_{12}}$ and $\overrightarrow{p_{13}-p_{12}}$ may have the upward direction (a positive value). Thus, d is less than zero (d<0) by Equation 1 so that the left landmark point $p_L=p_{11}$ and the right teeth landmark point $p_R=p_{13}$ when the scan data in FIG. 6 represent the maxilla data. In contrast, d is less than zero (d<0) by Equation 1 so that the left landmark point $p_L=p_{13}$ and the right teeth landmark point $p_R=p_{11}$ when the scan data in FIG. 6 represent the mandible data.

Figure 7:
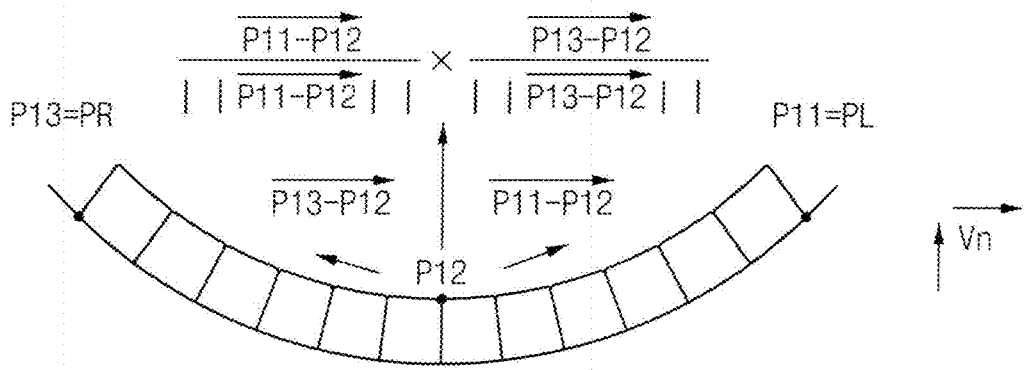

For example, in FIG. 7, teeth are protruded upward in the scan data, a third landmark point $p_{13}$ is disposed in a left portion of the scan data and a first landmark point $p_{11}$ is disposed in a right portion of the scan data.

In FIG. 7, since $\vec{v}_n$ has the upward direction, $\vec{v}_n=1$ when the upward direction is supposed to the positive direction. The cross product $\overrightarrow{p_{11}-p_{12}} \times \overrightarrow{p_{13}-p_{12}}$ of $\overrightarrow{p_{11}-p_{12}}$ and $\overrightarrow{p_{13}-p_{12}}$ may have the upward direction (a positive value). Thus, d is equal to or greater than zero (d>=0) by Equation 1 so that the left landmark point $p_L=p_{11}$ and the right teeth landmark point $p_R=p_{13}$ when the scan data in FIG. 7 represent the mandible data. In contrast, d is equal to or greater than zero (d>=0) by Equation 1 so that the left landmark point $p_L=p_{13}$ and the right teeth landmark point $p_R=p_{11}$ when the scan data in FIG. 7 represent the maxilla data.

Figure 8:
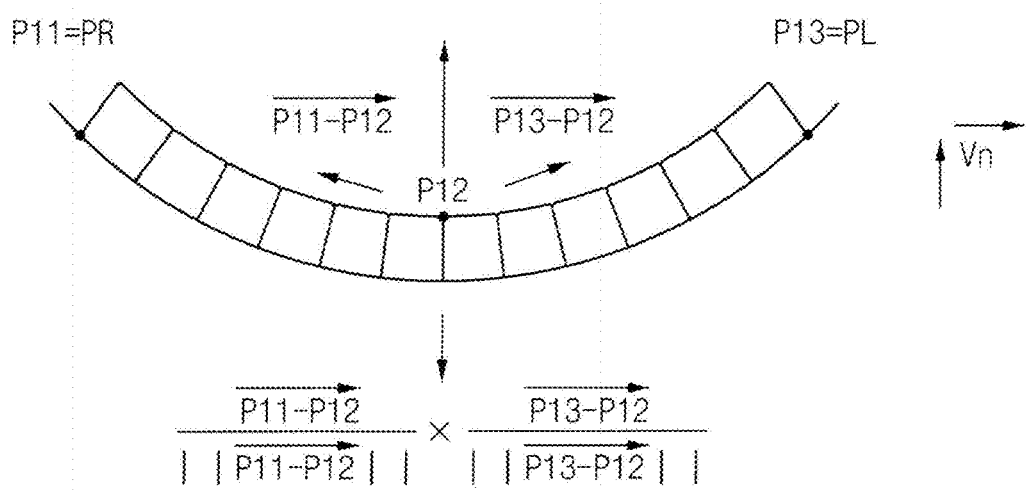

For example, in FIG. 8, teeth are protruded upward in the scan data, a first landmark point $p_{11}$ is disposed in a left portion of the scan data and a third landmark point $p_{13}$ is disposed in a right portion of the scan data.

In FIG. 8, since $\vec{v}_n$ has the upward direction, $\vec{v}_n=1$ when the upward direction is supposed to the positive direction. The cross product $\overrightarrow{p_{11}-p_{12}} \times \overrightarrow{p_{13}-p_{12}}$ of $\overrightarrow{p_{11}-p_{12}}$ and $\overrightarrow{p_{13}-p_{12}}$ may have the downward direction (a negative value). Thus, d is less than zero (d<0) by Equation 1 so that the left landmark point $p_L=p_{13}$ and the right teeth landmark point $p_R=p_{11}$ when the scan data in FIG. 8 represent the mandible data. In contrast, d is less than zero (d<0) by Equation 1 so that the left landmark point $p_L=p_{11}$ and the right teeth landmark point $p_R=p_{13}$ when the scan data in FIG. 8 represent the maxilla data.

When the scan data represent the maxilla data, the up vector $\vec{v}_S$ representing the direction of the patient's eyes and nose may be represented as following Equation 2.

$$\vec{v_S} = \left(\frac{\overrightarrow{p_R - p_{12}}}{\|\overrightarrow{p_R - p_{12}}\|}\right) \times \left(\frac{\overrightarrow{p_L - p_{12}}}{\|\overrightarrow{p_L - p_{12}}\|}\right) \quad \text{[Equation 2]}$$

For example, when the scan data of FIG. 5 represent the maxilla data, the left landmark point $p_L=p_{13}$ and the right teeth landmark point $p_R=p_{11}$ according to the discriminant. According to Equation 2, $\vec{v}_S$ which is a cross product of $p_R-p_{12}$ and $p_L-p_{12}$ may have the upward direction (a positive value).

When the scan data represent the mandible data, the up vector $\vec{v}_S$ representing the direction of the patient's eyes and nose may be represented as following Equation 3.

$$\vec{v_S} = \left(\frac{\overrightarrow{p_L - p_{12}}}{\|\overrightarrow{p_L - p_{12}}\|}\right) \times \left(\frac{\overrightarrow{p_R - p_{12}}}{\|\overrightarrow{p_R - p_{12}}\|}\right) \quad \text{[Equation 3]}$$

For example, when the scan data of FIG. 7 represent the mandible data, the left landmark point $p_L=p_{11}$ and the right teeth landmark point $p_R=p_{13}$ according to the discriminant. According to Equation 3, $\vec{v}_S$ which is a cross product of $p_L-p_{12}$ and $p_R-p_{12}$ may have the upward direction (a positive value).

Figure 9:
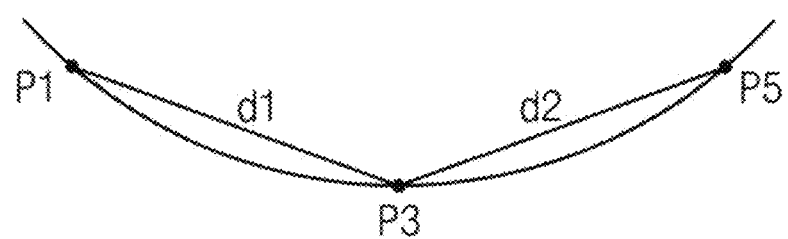
FIG. 9 illustrates the up vector when the scan data represent maxilla data.
Figure 10:
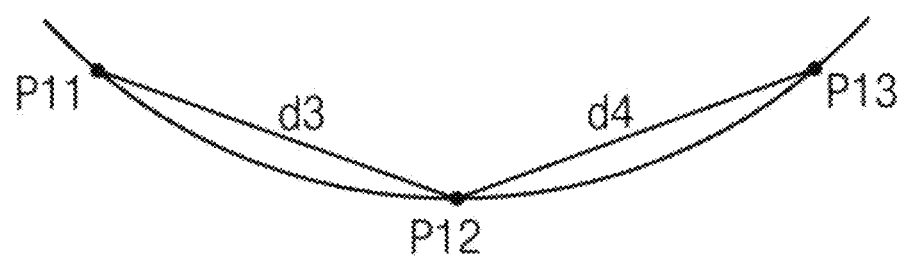
FIG. 10 illustrates the up vector when the scan data represent mandible data.

FIG. 9 illustrates the up vector when the scan data represent maxilla data. FIG. 10 illustrates the up vector when the scan data represent mandible data.

As shown in FIG. 9, when the scan data represent the maxilla data, a direction of the up vector $\vec{v}_S$ may be opposite to the protruded direction of the teeth.

As shown in FIG. 10, when the scan data represent the mandible data, a direction of the up vector $\vec{v}_S$ may be substantially the same as the protruded direction of the teeth.

Figure 11:
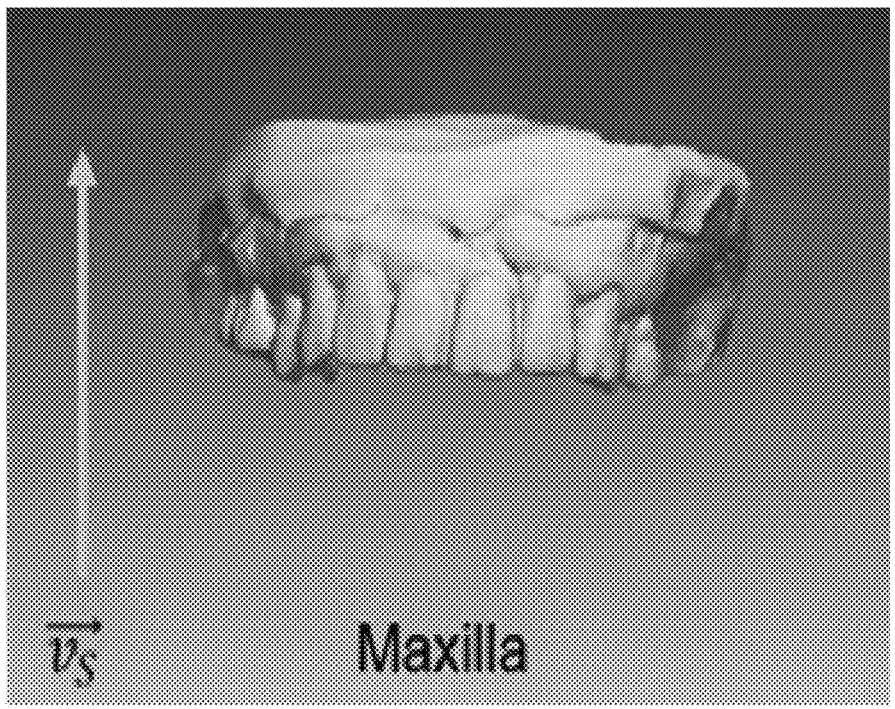
FIGS. 11 and 12 illustrate a step of determining whether the area of the CT data and the area of the scan data match of FIG. 1.
Figure 12:
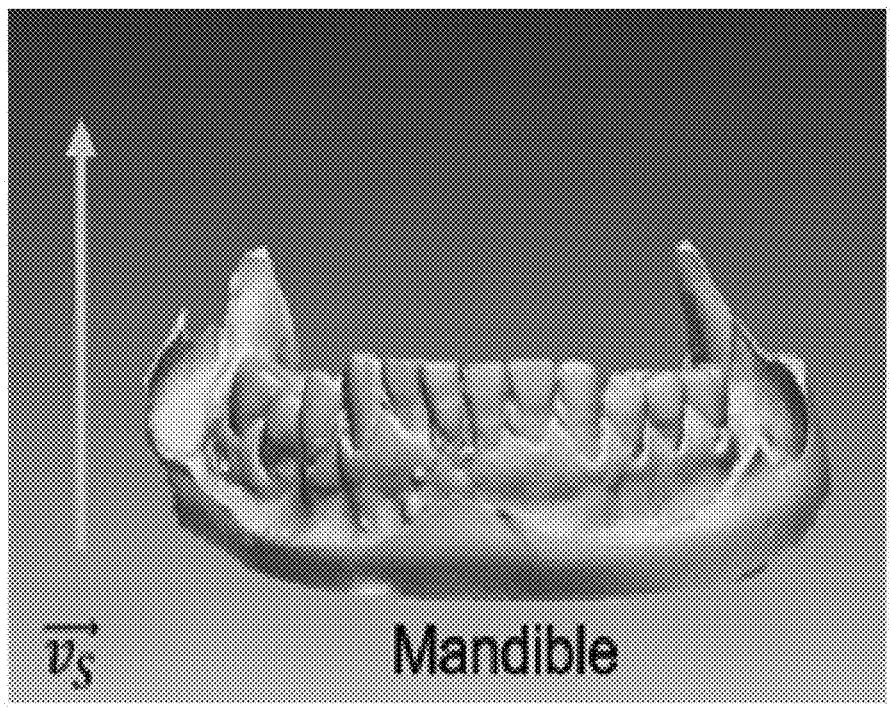

FIGS. 11 and 12 illustrate a step of determining whether the area of the CT data and the area of the scan data match of FIG. 1.

Referring to FIGS. 1 to 12, in the registration of the CT data and the scan data, Case 1 and Case 2 may be distinguished (step S400). Case 1 represents that the CT data and the scan data have the same area. Case 2 represents that the CT data and the scan data have different areas. When following Equation 4 is satisfied, it may be determined that the CT data and the scan data have the same area.

$$\|(d_1+d_2)-(d_3+d_4)\| < th \quad \text{[Equation 4]}$$

Herein, $d_1=\|p_1-p_3\|$, $d_2=\|p_5-p_3\|$, $d_3=\|p_{11}-p_{12}\|$, $d_4=\|p_{13}-p_{12}\|$, th is a first threshold value for determining that the CT data and the scan data have the same area. For example, the first threshold value th may be about 5 mm.

Figure 13:
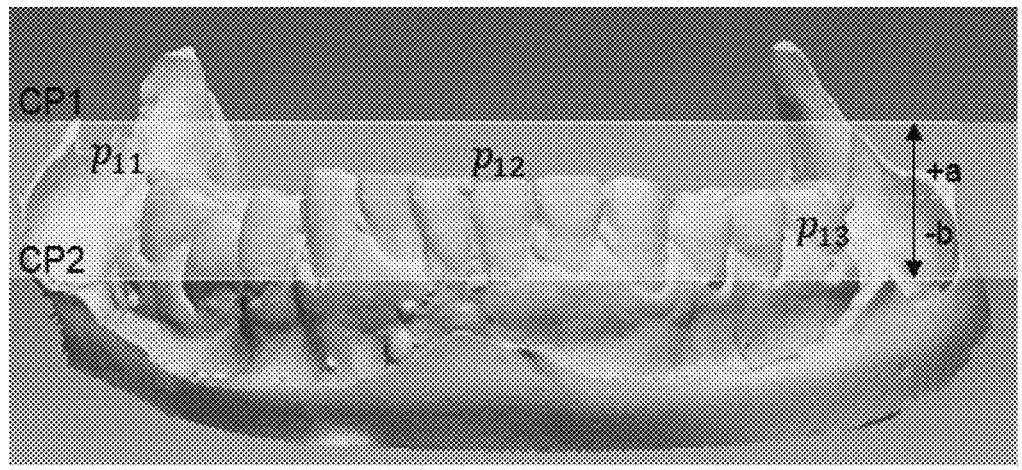
FIGS. 13 and 14 illustrate a step of extracting a teeth portion of the scan data of FIG. 1.
Figure 14:
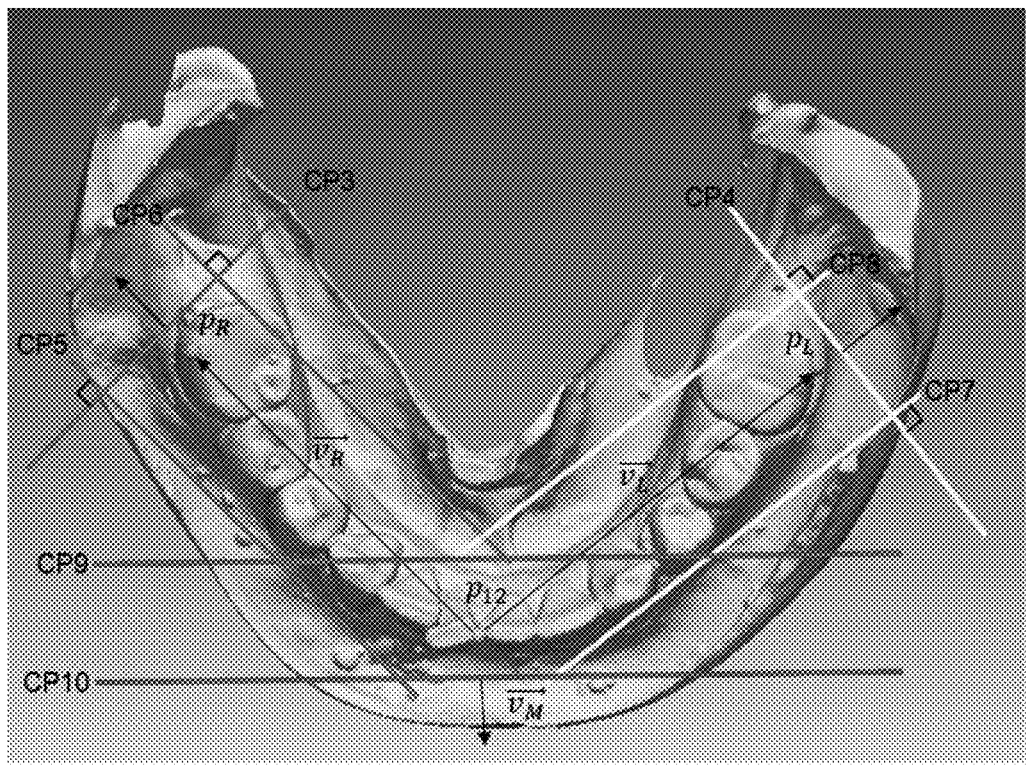
Figure 15:
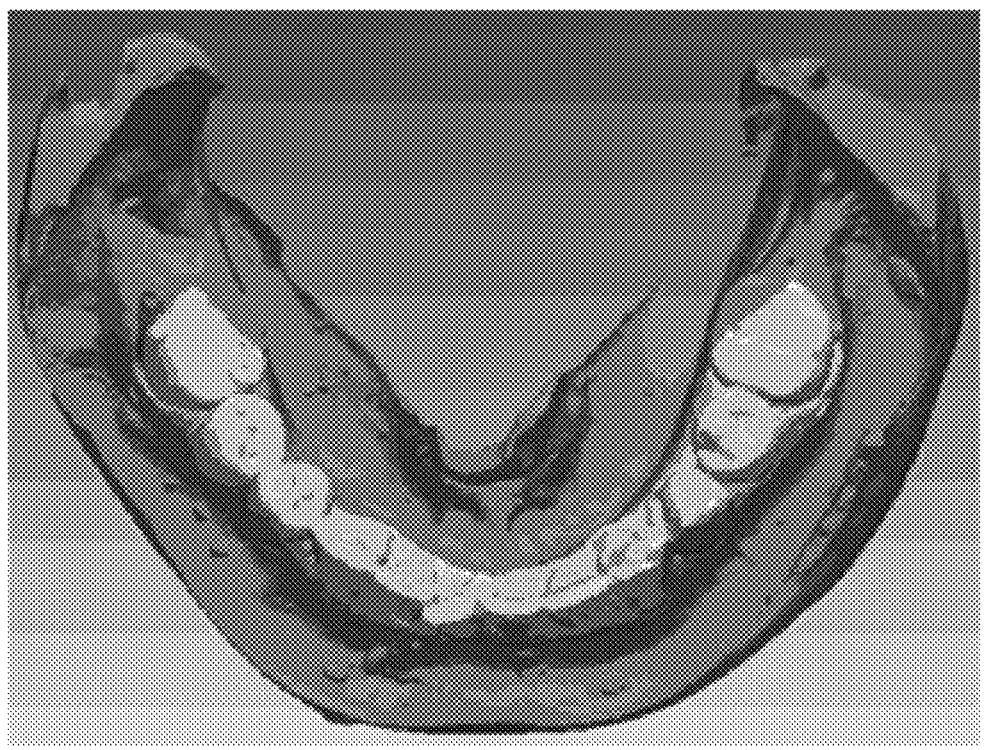
FIG. 15 illustrates the teeth portion extracted by the step of extracting the teeth portion of the scan data of FIG. 1.

FIGS. 13 and 14 illustrate a step of extracting a teeth portion of the scan data of FIG. 1. FIG. 15 illustrates the teeth portion extracted by the step of extracting the teeth portion of the scan data of FIG. 1.

Referring to FIGS. 1 to 15, in order to perform the registration based on the teeth portion, which is a common area between the two data, only the teeth portion may be cut out from the scan data (step S500). When the scan data represent the maxilla data, the highest point is extracted among the first landmark point $p_{11}$, the second landmark point $p_{12}$ and the third landmark point $p_{13}$ in the direction of the up vector $\vec{v}_S$. When the scan data represent the mandible data, the lowest point is extracted among the first landmark point the second landmark point $p_{12}$ and the third landmark point $p_{13}$ in the direction of the up vector $\vec{v}_S$.

When the scan data represent the maxilla data, the scan data may be cut into an infinite plane having a normal vector of $\vec{v}_S$ at a point moved from the highest point of the scan data by a first distance (+a) in the positive direction of the up vector $\vec{v}_S$ and the scan data may be cut into an infinite plane having a normal vector of $\vec{v}_S$ at a point moved from the highest point of the scan data by a second distance (−b) in the negative direction of the up vector $\vec{v}_S$ (FIG. 13). For example, the first distance (+a) may be about 6 mm. For example, the second distance (−b) may be about −6 mm. For example, an absolute value of the first distance (+a) may be equal to an absolute value of the second distance (−b). Alternatively, the absolute value of the first distance (+a) may be different from the absolute value of the second distance (−b).

When the scan data represent the mandible data, the scan data may be cut into an infinite plane CP1 having a normal vector of $\vec{v}_S$ at a point moved from the lowest point of the scan data by the first distance (+a) in the positive direction of the up vector $\vec{v}_S$ and the scan data may be cut into an infinite plane CP2 having a normal vector of $\vec{v}_S$ at a point moved from the lowest point of the scan data by the second distance (−b) in the negative direction of the up vector $\vec{v}_S$ (FIG. 13).

As shown in FIG. 14, a vector from the second landmark point $p_{12}$ to the right teeth landmark point $p_R$ may be defined as and a vector $\vec{v}_R$ from the second landmark point $p_{12}$ to the left teeth landmark point $p_L$ may be defined as $\vec{v}_L$. The scan data may be cut into an infinite plane CP3 having a normal vector of $\vec{v}_R$ at a point moved from the right teeth landmark point $p_R$ by a third distance in the direction of $\vec{v}_R$. The scan data may be cut into an infinite plane CP4 having a normal vector of $\vec{v}_L$ at a point moved from the left teeth landmark point $p_L$ by the third distance in the direction of $\vec{v}_L$. For example, an absolute value of the third distance may be less than an absolute value of the first distance and an absolute value of the second distance. Herein, the third distance may be about 1 mm.

A first vector may be defined as a vector rotated by −90 degrees from the vector $\vec{v}_R$. The scan data may be cut out into an infinite plane CP5 having a normal vector of the first vector at a point moved from the right teeth landmark point $p_R$ by the third distance in the direction of $\vec{v}_R$ and by a fourth distance in the direction of the first vector. A second vector may be defined as a vector rotated by +90 degrees from the vector $\vec{v}_R$. The scan data may be cut out into an infinite plane CP6 having a normal vector of the second vector at a point moved from the right teeth landmark point $p_R$ by the third distance in the direction of $\vec{v}_R$ and by the fourth distance in the direction of the second vector. For example, an absolute value of the fourth distance may be greater than the absolute value of the first distance, the absolute value of the second distance and the absolute value of the third distance. Herein, the fourth distance may be about 10 mm.

A third vector may be defined as a vector rotated by +90 degrees from the vector $\vec{v}_L$. The scan data may be cut out into an infinite plane CP7 having a normal vector of the third vector at a point moved from the left teeth landmark point $p_L$ by the third distance in the direction of $\vec{v}_L$ and by the fourth distance in the direction of the third vector. A fourth vector may be defined as a vector rotated by −90 degrees from the vector $\vec{v}_L$. The scan data may be cut out into an infinite plane CP8 having a normal vector of the fourth vector at a point moved from the left teeth landmark point $p_L$ by the third distance in the direction of $\vec{v}_L$ and by the fourth distance in the direction of the fourth vector.

In addition, the scan data may be cut out into an infinite plane CP10 having a normal vector of a vector of $\vec{v}_M$ which is a sum of $\vec{v}_L$ and $\vec{v}_R$ at a point moved from the second landmark point $p_{12}$ by a fifth distance in the direction of $\vec{v}_M$. The scan data may be cut out into an infinite plane CP9 having a normal vector of a vector of $-\vec{v}_M$ at a point moved from the second landmark point $p_{12}$ by the fifth distance in the direction of $-\vec{v}_M$. For example, an absolute value of the fifth distance may be greater than the absolute value of the third distance and less than the absolute value of the fourth distance. Herein, the fifth distance may be about 6 mm.

FIG. 15 represents the teeth portion obtained by cutting the scan data using the cutting planes CP1 to CP10.

A parametric spline curve C(u) may be calculated using the first to fifth landmark points p1 to p5 of the maxilla of the CT data as control points. Herein, u satisfies 0<=u<=1. u=0 at a leftmost side of the patient and u=1 at a rightmost side of the patient.

The parametric spline curve C(u) may mean the spline curve of an arch connecting the five landmark points p1 to p5 of the maxilla of the CT data. Alternatively, the parametric spline curve C(u) may be calculated using the five landmark points p6 to p10 of the mandible of the CT data as control points.

The source point of the scan data may be searched on the CT spline curve C(u) to generate a target point (step S600).

The source points of the scan data may include three points of the left teeth landmark point $p_L$ the second landmark point $p_{12}$ and the right teeth landmark point $p_R$.

A first point of the target point may be searched on C(u) while increasing the parameter u by a first value. The first point of the target point may be represented ad C(u1). The first value may be about 0.05.

A second point of the target point may be searched on C(u) while increasing the parameter u by a second value. The second point of the target point may be represented ad C(u2). The second point C(u2) of the target point may be a point minimizing the d11=‖C(u1)−C(u2)‖−‖$p_L$−$p_{12}$‖. Herein, u>u1 and the second value may be about 0.001.

A third point of the target point may be searched on C(u) while increasing the parameter u by a third value. The third point of the target point may be represented ad C(u3). The third point C(u3) of the target point may be a point minimizing the $d12=\|C(u2)-C(u3)\|-\|p_{12}-p_R\|$. Herein, u>u2 and the third value may be about 0.001.

When all of d11, d12 and $d13=\|C(u3)-C(u1)\|-\|p_R-p_L\|$ are less than a second threshold value, the target points C(u1), C(u2) and C(u3) may be selected as a candidate. The second threshold value may be about 8 mm.

Figure 16:
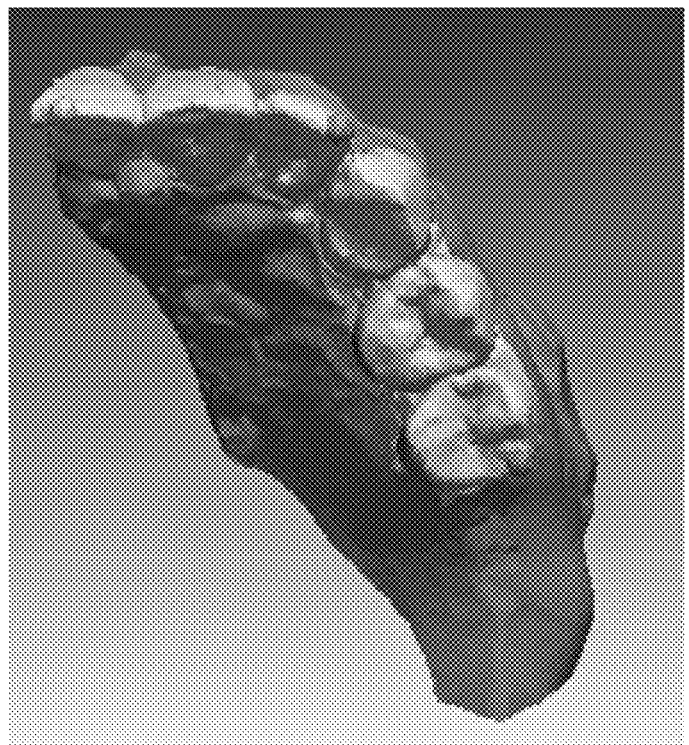
FIG. 16 illustrates the teeth portion extracted by the step of extracting the teeth portion of the scan data of FIG. 1.

FIG. 16 illustrates the teeth portion extracted by the step of extracting the teeth portion of the scan data of FIG. 1.

Referring to FIGS. 1 to 16, in the present embodiment, Case 2 in which the CT data and the scan data have different areas is illustrated. For example, the CT data may include an entire area of the patient's teeth, but the scan data may include only a portion of the patient's teeth. Although, for example, the CT data include the entire area of the patient's teeth, but the scan data include only a portion of the patient's teeth in the present embodiment, the present inventive concept may not be limited thereto.

When Equation 4 is satisfied, the CT data and the scan data may be distinguished as Case 1 in which the CT data and the scan data have substantially the same area. When Equation 4 is not satisfied, the CT data and the scan data may be distinguished as Case 2 in which the CT data and the scan data have different areas. In the present embodiment, Equation 4 may not be satisfied so that the CT data and the scan data may have different areas.

As shown in FIG. 16, the scan data may include a portion of the patient's teeth.

Figure 17:
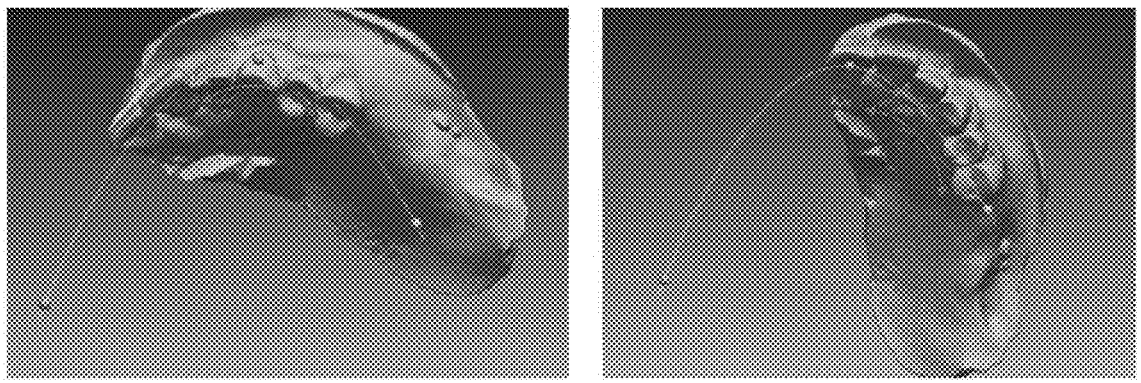
FIG. 17 illustrates a step of searching for a source point of the scan data on the CT spline curve of FIG. 1.

FIG. 17 illustrates a step of searching for a source point of the scan data on the CT spline curve of FIG. 1.

Referring to FIGS. 1 to 17, as explained referring to FIG. 15, in FIG. 16, a parametric spline curve C(u) may be calculated using the first to fifth landmark points p1 to p5 of the maxilla of the CT data as control points.

For the scan data of FIG. 16, the source point of the scan data may be searched on the CT spline curve C(u) to generate a target point (step S600).

The source points of the scan data may include three points of the left teeth landmark point $p_L$, the second landmark point $p_{12}$ and the right teeth landmark point.

A first point of the target point may be searched on C(u) while increasing the parameter u by a first value. The first point of the target point may be represented ad C(u1). The first value may be about 0.05.

A second point of the target point may be searched on C(u) while increasing the parameter u by a second value. The second point of the target point may be represented ad C(u2). The second point C(u2) of the target point may be a point minimizing the $d11=\|C(u1)-C(u2)\|-\|p_L-p_{12}\|$. Herein, u>u1 and the second value may be about 0.001.

A third point of the target point may be searched on C(u) while increasing the parameter u by a third value. The third point of the target point may be represented ad C(u3). The third point C(u3) of the target point may be a point minimizing the $d12=\|C(u2)-C(u3)\|-\|p_{12}-p_R\|$. Herein, u>u2 and the third value may be about 0.001.

When all of d11, d12 and $d13=\|C(u3)-C(u1)\|-\|p_R-p_L\|$ are less than a second threshold value, the target points C(u1), C(u2) and C(u3) may be selected as a candidate. The second threshold value may be about 8 mm.

Figure 18A:
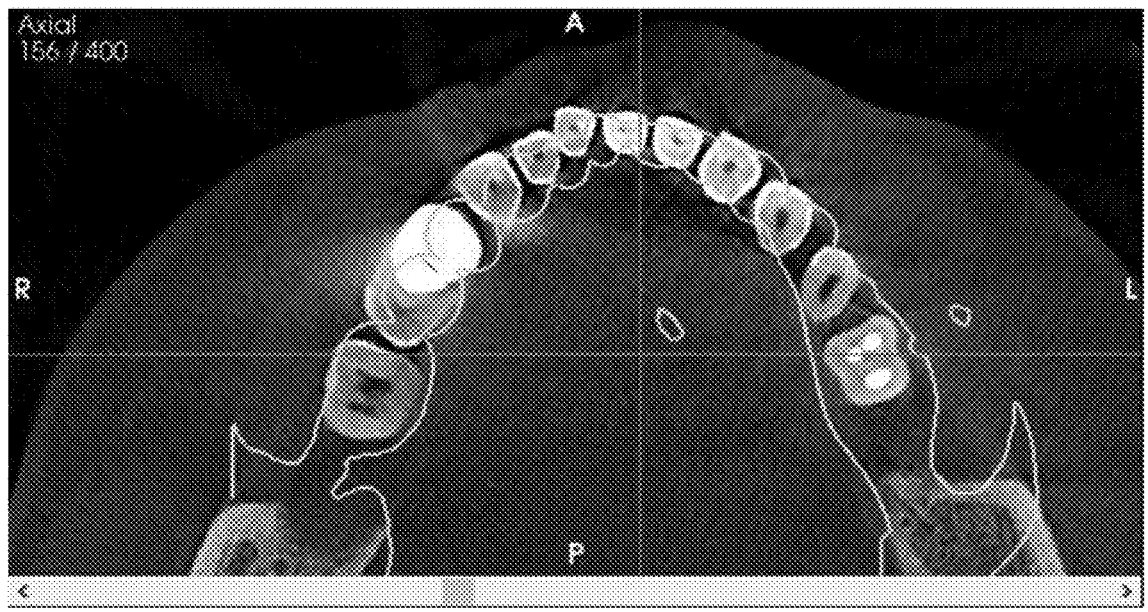
FIGS. 18A to 18C illustrate results of a step of the coarse registration of FIG. 1.
Figure 18B:
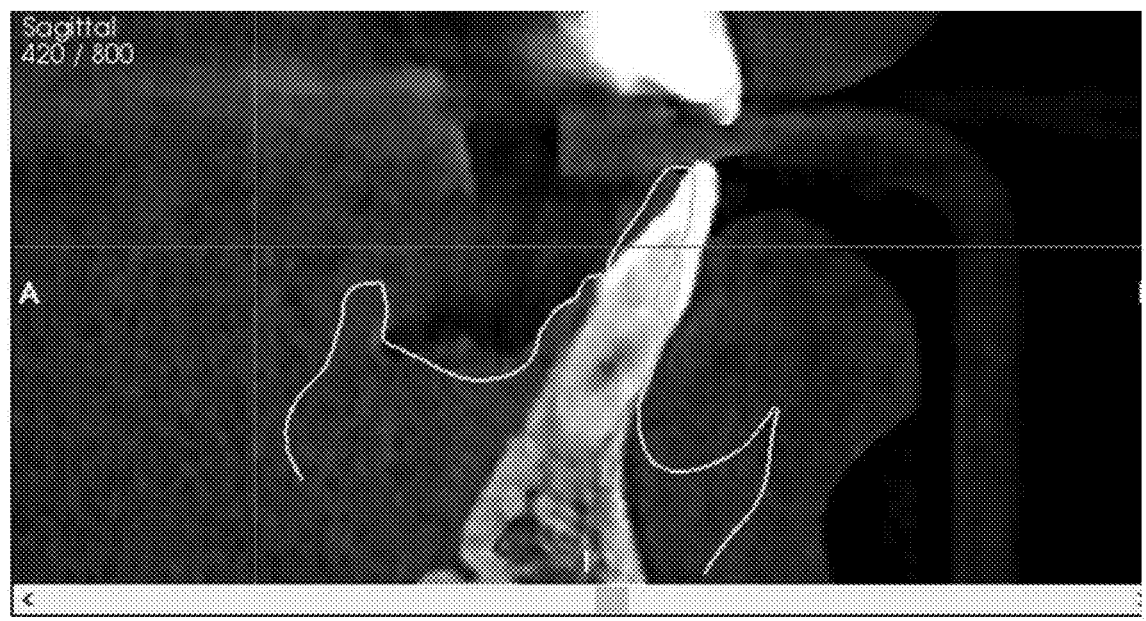
Figure 18C:
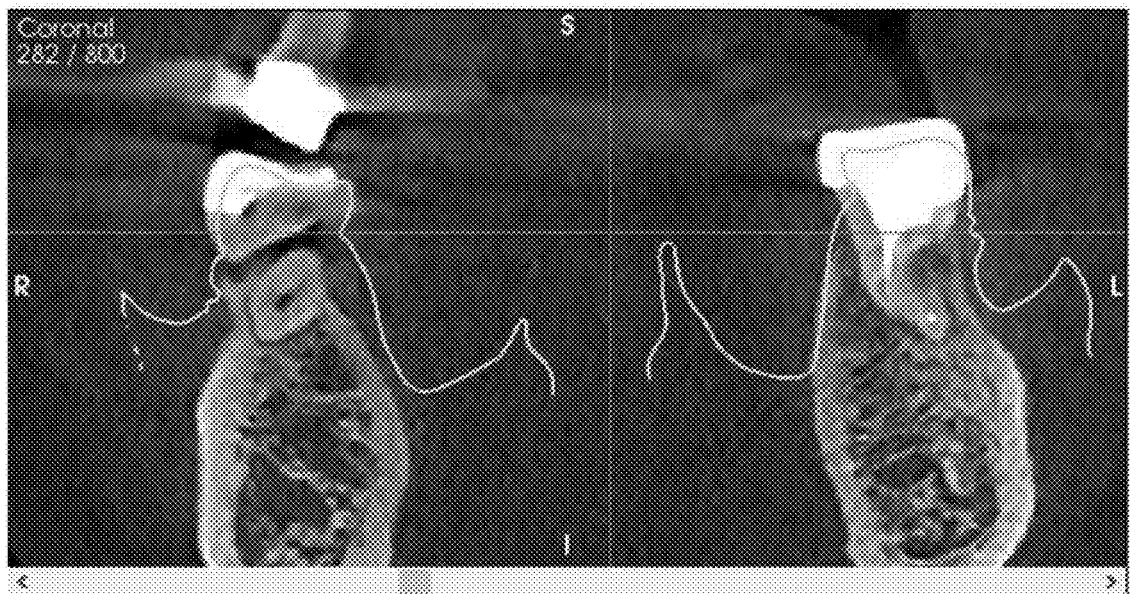

FIGS. 18A to 18C illustrate results of a step of the coarse registration of FIG. 1.

Referring to FIGS. 1 to 18C, a candidate target point group may include six points and a plurality of the candidate target point groups may be generated in the step S500.

Transform matrices M may be calculated by a landmark transform for the plural of the candidate target point groups. A transform error may be calculated as an average of distances between the transformed landmark points pi'=Mpi, (i=L, 12, R) of the scan data and the landmark points pk(k=1, 3, 5 or k=6, 8, 10) of the CT data. The transform matrix M may move the landmark points of the scan data to a domain of the CT data.

In the step S400, in Case 1 in which the CT data and the scan data have substantially the same area, the candidate target point group having the smallest transform error may be determined as a final candidate.

A step of moving the landmark points of the scan data to the domain of the CT data and a step of determining the final candidate having the smallest transform error may be referred to the coarse registration (step S700).

In the step S400, in Case 2 in which the CT data and the scan data have the different areas, the candidate target point group having the smallest transform error may not be determined as the final candidate because, in case 2, the left teeth landmark point $p_L$, the second landmark point $p_{12}$ and the right teeth landmark point $p_R$ do not correspond to the first land mark p1, the third land mark p3 and the fifth landmark p5 of the CT data.

Instead, in Case 2, the final candidate may be determined in a step of the fine registration (step S800) explained hereinafter.

In FIGS. 18A to 18C, a background image representing a shape of the teeth may be the CT data. In FIGS. 18A to 18C, a solid line may be an outline of the scan data generated by the registration with the CT data. FIG. 18A represents an axial view after the coarse registration of the CT data and the scan data. FIG. 18B represents a sagittal view after the coarse registration of the CT data and the scan data. FIG. 18C represents a coronal view after the coarse registration of the CT data and the scan data.

Figure 19A:
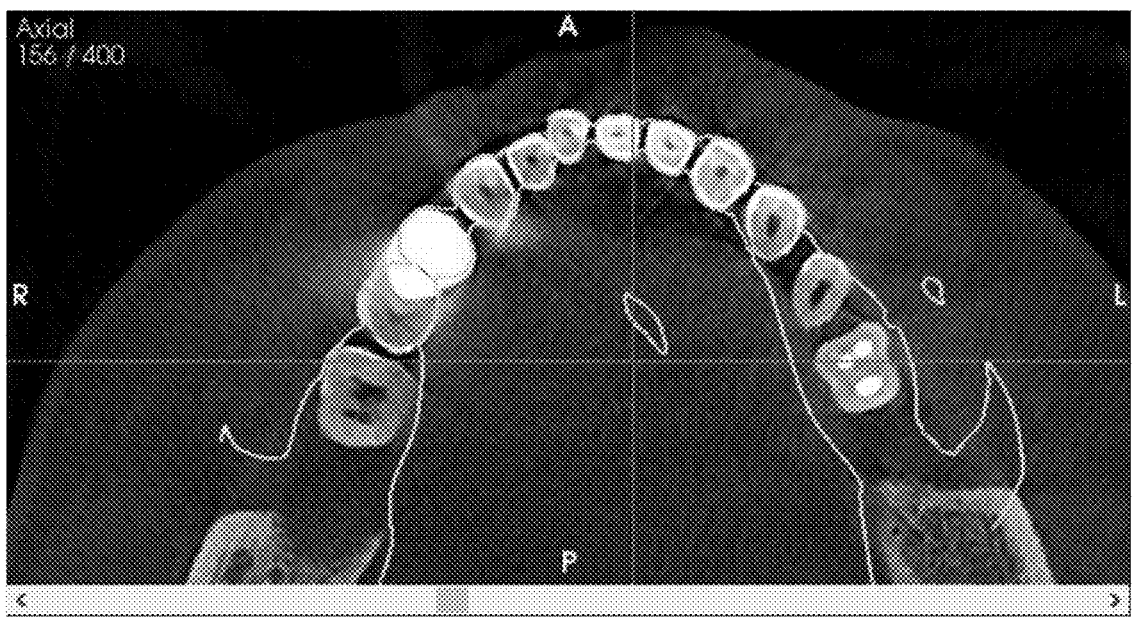
FIGS. 19A to 19C illustrate results of a step of the fine registration of FIG. 1.
Figure 19B:
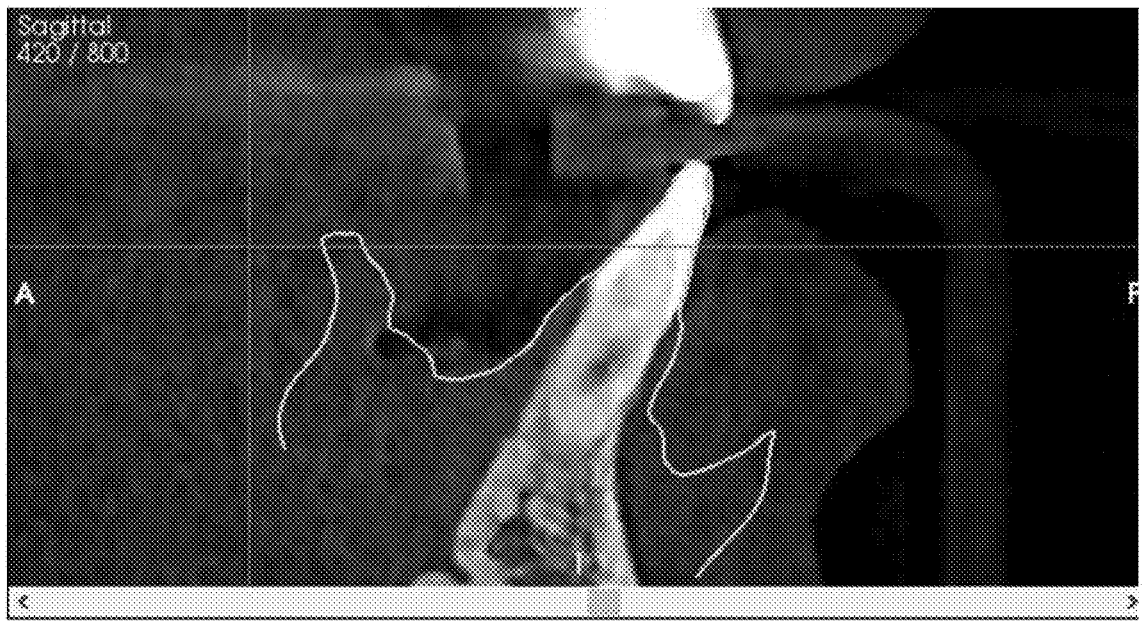
Figure 19C:
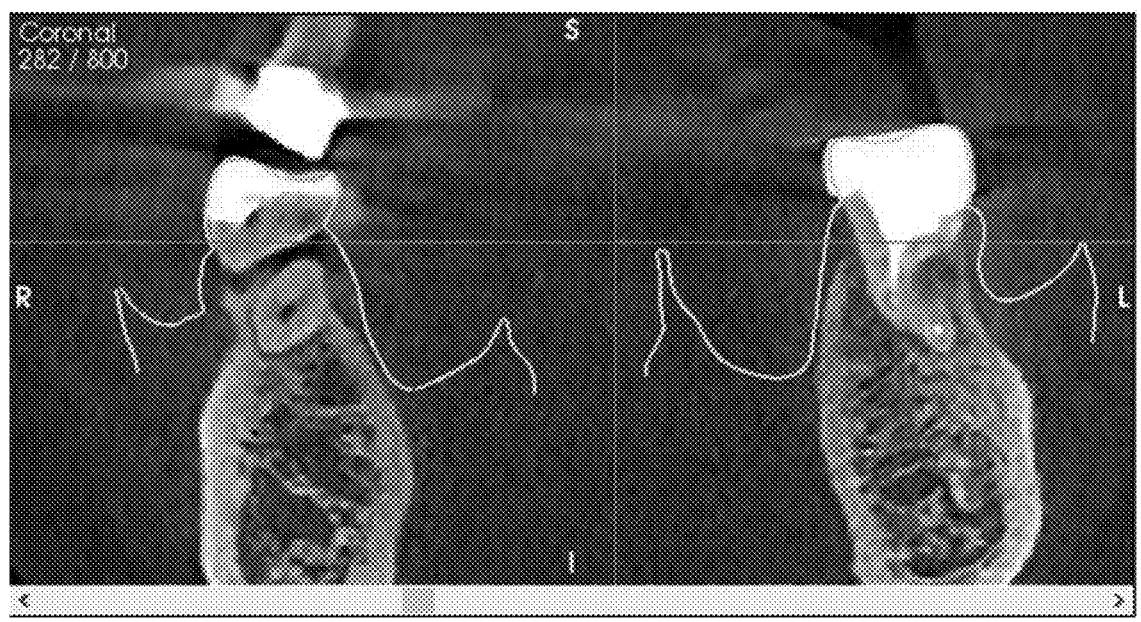

FIGS. 19A to 19C illustrate results of a step of the fine registration of FIG. 1.

Referring to FIGS. 1 to 19C, after the coarse registration (step S700), the fine registration (step S800) for further matching the teeth area of the CT data with the teeth area of the scan data may be operated. In the fine registration, the cut teeth portion of the scan data may be used for the source data and the CT image of the patient may be used for the target data.

In FIGS. 19A to 19C, a background image representing a shape of the teeth may be the CT data. In FIGS. 19A to 19C, a solid line may be an outline of the scan data generated by the registration with the CT data. FIG. 19A represents an axial view after the fine registration of the CT data and the scan data. FIG. 18B represents a sagittal view after the fine registration of the CT data and the scan data. FIG. 18C represents a coronal view after the fine registration of the CT data and the scan data.

As shown in FIGS. 19A to 19C, the teeth portion of the CT data and the teeth portion of the scan data may be more precisely matched compared to FIGS. 18A to 18C.

In Case 2 in which the CT data and the scan data have the different areas, the fine registration may be operated for the plurality of the candidate target point groups. A final candidate among the plurality of the candidate target point groups may be recommended to the user by arranging the results of the fine registration in an order of the smallest error.

The user may determine one of the candidate target point groups to the final candidate based on the error obtained by the fine registration.

According to the present embodiment, even if there is no user input and the data areas are different, a good initial registration result may be obtained. Accordingly, the result of the fine registration may be quickly obtained without the user input.

According to the automated method for aligning 3D dental data, the time and effort for registration of the patient medical image data (CT or CBCT) and the digital impression model scan data, which is frequently performed for diagnosis, analysis and prosthesis production in dental clinics and dental laboratories, may be dramatically reduced.

According to an embodiment of the present inventive concept, a non-transitory computer-readable storage medium having stored thereon program instructions of the automated method for aligning 3D dental data may be provided. The above mentioned method may be written as a program executed on a computing device such as a computer. The method may be implemented in a general purpose digital computer which operates the program using a computer-readable medium. In addition, the structure of the data used in the above mentioned method may be written on a computer readable medium through various means. The computer readable medium may include program instructions, data files and data structures alone or in combination. The program instructions written on the medium may be specially designed and configured for the present inventive concept, or may be generally known to a person skilled in the computer software field. For example, the computer readable medium may include a magnetic medium such as a hard disk, a floppy disk and a magnetic tape, an optical recording medium such as CD-ROM and DVD, a magneto-optical medium such as floptic disc and a hardware device specially configured to store and execute the program instructions such as ROM, RAM and a flash memory. For example, the program instructions may include a machine language codes produced by a compiler and high-level language codes which may be executed by a computer using an interpreter or the like. The hardware device may be configured to operate as one or more software modules to perform the operations of the present inventive concept.

In addition, the above mentioned method for aligning 3D dental data may be implemented in a form of a computer-executed computer program or an application which are stored in a storage method.

The present inventive concept is related to the automated method for aligning 3D dental data and the non-transitory computer-readable storage medium having stored thereon program instructions of the automated method for aligning 3D dental data, the time and effort for registration of the dental CT data and the digital impression model may be reduced.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. An automated method for aligning 3D (three-dimensional) dental data, the method comprises:
   extracting landmark points of a CT (computerized tomography) data;
   extracting landmark points of scan data of a digital impression model;
   determining an up vector representing a direction of a patient's eyes and nose and identifying left and right of the landmark points of the scan data;
   extracting a teeth portion of the scan data;
   searching a source point of the scan data on a spline curve of the CT data to generate a candidate target point group; and
   determining the candidate target point group having a smallest error with the landmark points of the CT data as a final candidate;
   wherein extracting a teeth portion of the scan data further comprises:
      extracting a highest and lowest point among a first landmark point, a second landmark point and a third landmark point of the scan data in a direction of the up vector when the scan data represent maxilla data,
      wherein a vector from the second landmark point of the scan data to a right teeth landmark point is defined as $\vec{v}_R$, and a vector from the second landmark point to a left teeth landmark point is defined as $\vec{v}_L$,
      cutting the scan data into a plane having a normal vector of $\vec{v}_R$ at a point moved from the right teeth landmark point by a third distance in the direction of $\vec{v}_R$ and,
      cutting the scan data into a plane having a normal vector of $\vec{v}_L$ at a point moved from the left teeth landmark point by the third distance in the direction of $\vec{v}_L$.

2. The method of claim 1, wherein the landmark points of the CT data include three or more landmark points in a maxilla and three or more landmark points in a mandible, and
   wherein the landmark points of the scan data includes three landmark points.

3. The method of claim 2, wherein a first landmark point and a third landmark point of the scan data indicate outermost points of teeth of the scan data in a lateral direction.

4. The method of claim 1, wherein when a first landmark point of the scan data is $p_{11}$, a second landmark point of the scan data is $p_{12}$, a third landmark point of the scan data is $p_{13}$ and an average vector obtained by averaging all normal vectors from all points forming meshes of the scan data is $\vec{v}_n$, the left and the right of the landmark points of the scan data are identified using a cross product of $\overrightarrow{p_{11}-p_{12}}$ and $\overrightarrow{p_{13}-p_{12}}$ and the average vector $\vec{v}_n$.

5. The method of claim 4, wherein when the scan data represent maxilla data and a discriminant d<0, a left teeth landmark point $p_L$ representing a left outermost point of teeth of the patient is $p_{11}$ and a right teeth landmark point $p_R$ representing a right outermost point of the teeth of the patient is $p_{13}$,
wherein when the scan data represent the maxilla data and the discriminant d>=0, the left teeth landmark point $p_L$ is $p_{13}$ and the right teeth landmark point $p_R$ is $p_{11}$, and wherein the discriminant d is defined as $$d = \vec{v_n} \cdot \left\{ \left( \frac{\overrightarrow{p_{11} - p_{12}}}{\|\overrightarrow{p_{11} - p_{12}}\|} \right) \times \left( \frac{\overrightarrow{p_{13} - p_{12}}}{\|\overrightarrow{p_{13} - p_{12}}\|} \right) \right\}.$$

6. The method of claim 5, wherein when the scan data represent a mandible data and the discriminant d<0, the left teeth landmark point $p_L$ is $p_{13}$, and the right teeth landmark point $p_R$ is $p_{11}$, and
wherein when the scan data represent the mandible data and the discriminant d>=0, the left teeth landmark point $p_L$ is $p_{11}$ and the right teeth landmark point $p_R$ is $p_{13}$.

7. The method of claim 1, wherein when the up vector is $\vec{v_S}$, a left teeth landmark point representing a left outermost point of a teeth of the patient is $p_L$, a right teeth landmark point representing a right outermost point of the teeth of the patient is $p_R$, a second landmark point of the scan data is $p_{12}$, and the scan data represent the maxilla data, $$\vec{v_S} = \left( \frac{\overrightarrow{p_R - p_{12}}}{\|\overrightarrow{p_R - p_{12}}\|} \right) \times \left( \frac{\overrightarrow{p_L - p_{12}}}{\|\overrightarrow{p_L - p_{12}}\|} \right).$$

8. The method of claim 1, wherein when the up vector is $\vec{v_S}$, a left teeth landmark point representing a left outermost point of a teeth of the patient is $p_L$, a right teeth landmark point representing a right outermost point of the teeth of the patient is $p_R$, a second landmark point of the scan data is $p_{12}$, and the scan data represent the mandible data, $$\vec{v_S} = \left( \frac{\overrightarrow{p_L - p_{12}}}{\|\overrightarrow{p_L - p_{12}}\|} \right) \times \left( \frac{\overrightarrow{p_R - p_{12}}}{\|\overrightarrow{p_R - p_{12}}\|} \right).$$

9. The method of claim 1, further comprising determining whether the CT data and the scan data correspond to a same data area of the patient,
wherein when $d_1=\|p_1-p_3\|$, $d_2=\|p_5-p_3\|$, $d_3=\|p_{11}-p_{12}\|$, $d_4=\|p_{13}-p_{12}\|$, is a first threshold value for determining that the CT data and the scan data correspond to the same data area of the patient, p1, p3 and p5 are the landmark points of the CT data, $p_{11}$, $p_{12}$ and $p_{13}$ are the landmark points of the scan data and $\|(d_1+d_2)-(d_3+d_4)\|$<th is satisfied, the CT data and the scan data are determined to correspond to the same data area of the patient.

10. The method of claim 1, wherein the extracting the teeth portion of the scan data further comprises:
cutting the scan data into a plane having a normal vector of the up vector at a point moved from the highest point by a first distance in a positive direction of the up vector; and
cutting the scan data into a plane having a normal vector of the up vector at a point moved from the highest point by a second distance in a negative direction of the up vector.

11. The method of claim 10, wherein the extracting the teeth portion of the scan data further comprises:
cutting the scan data into a plane having a normal vector of the up vector at a point moved from the lowest point by the first distance in a positive direction of the up vector; and
cutting the scan data into a plane having a normal vector of the up vector at a point moved from the lowest point by the second distance in a negative direction of the up vector.

12. The method of claim 1, wherein an absolute value of the third distance is less than an absolute value of the first distance and an absolute value of the second distance.

13. The method of claim 1, wherein a first vector is defined as a vector rotated by −90 degrees from the vector $\vec{v_R}$, a second vector is defined as a vector rotated by +90 degrees from the vector $\vec{v_R}$, a third vector is defined as a vector rotated by +90 degrees from the vector $\vec{v_L}$, a fourth vector is defined as a vector rotated by −90 degrees from the vector $\vec{v_L}$
wherein the extracting the teeth portion of the scan data further comprises:
cutting the scan data into a plane having a normal vector of the first vector at a point moved from the right teeth landmark point by the third distance in the direction of $\vec{v_R}$ and by a fourth distance in the direction of the first vector;
cutting the scan data into a plane having a normal vector of the second vector at a point moved from the right teeth landmark point by the third distance in the direction of $\vec{v_R}$ and by the fourth distance in the direction of the second vector;
cutting the scan data into a plane having a normal vector of the third vector at a point moved from the left teeth landmark point by the third distance in the direction of $\vec{v_L}$ and by the fourth distance in the direction of the third vector; and
cutting the scan data into a plane having a normal vector of the fourth vector at a point moved from the left teeth landmark point by the third distance in the direction of $\vec{v_L}$ and by the fourth distance in the direction of the fourth vector.

14. The method of claim 13, wherein an absolute value of the fourth distance is greater than an absolute value of the first distance, an absolute value of the second distance and an absolute value of the third distance.

15. The method of claim 1, wherein the extracting the teeth portion of the scan data further comprises:
cutting the scan data into a plane having a normal vector of a vector of $\vec{v_M}$ which is a sum of $\vec{v_L}$ and $\vec{v_R}$ at a point moved from the second landmark point by a fifth distance in the direction of $\vec{v_M}$; and
cutting the scan data into a plane having a normal vector of a vector of $-\vec{v_M}$ at a point moved from the second landmark point by the fifth distance in the direction of $-\vec{v_M}$.

16. The method of claim 1, wherein the searching the source point of the scan data on the spline curve of the CT data comprises calculating the spline curve C(u) based on a plurality of landmark points of a maxilla of the CT data or a plurality of landmark points of a mandible of the CT data.

17. The method of claim 16, wherein the source point includes three points of a left teeth landmark point, a second landmark point and a right teeth landmark point.

18. The method of claim 17, wherein $p_L$ is the left teeth landmark point, pie is the second landmark point, and $p_R$ is the right teeth landmark point,
  wherein a first point C(u1) of a target point is searched on C(u) while increasing a parameter u by a first value, a second point C(u2) of the target point is searched on C(u) while increasing the parameter u by a second value, the second point C(u2) of the target point is a point minimizing the $d11=\|C(u1)-C(u2)\|-\|p_L-p_{12}\|$, a third point C(u3) of the target point is searched on C(u) while increasing the parameter u by a third value, the third point C(u3) of the target point is a point minimizing the $d12=\|C(u2)-C(u3)\|-\|p_{12}-p_R\|$,
  wherein when all of d11, d12 and $d13=\|C(u3)-C(u1)\|-\|p_R-p_L\|$ are less than a second threshold value, the target points C(u1), C(u2) and C(u3) are selected as the candidate target point group, and
  wherein the target point group includes three points of C(u1), C(u2) and C(u3).

19. The method of claim 16, wherein the determining the candidate target point group having the smallest error with the landmark points of the CT data as the final candidate comprises:
  transforming the candidate target point group to a domain of the CT data using a transform matrix; and
  calculating a transform error as an average of distances between the transformed candidate target point group and the landmark points of the CT data.

20. The method of claim 1 further comprise:
  Including a non-transitory computer-readable storage medium having stored thereon at least one program comprising commands, which when executed by at least one hardware processor, performs the method.

21. An automated method for aligning 3D (three-dimensional) dental data, the method comprises:
  extracting landmark points of a CT (computerized tomography) data;
  extracting landmark points of scan data of a digital impression model;
  determining an up vector representing a direction of a patient's eyes and nose and identifying left and right of the landmark points of the scan data;
  determining whether the CT data and the scan data correspond to a same data area of a patient;
  extracting a teeth portion of the scan data;
  searching a source point of the scan data on a spline curve of the CT data to generate a candidate target point group when the CT data and the scan data have different areas; and
  recommending a candidate target point group having a smallest error of a registration of the CT data and the scan data among the plural candidate target point groups as a final candidate;
  wherein extracting a teeth portion of the scan data further comprises:
    extracting a highest and lowest point among a first landmark point, a second landmark point and a third landmark point of the scan data in a direction of the up vector when the scan data represent maxilla data,
    wherein a vector from the second landmark point of the scan data to a right teeth landmark point is defined as $\vec{v}_R$, and a vector from the second landmark point to a left teeth landmark point is defined as $\vec{v}_L$,
    cutting the scan data into a plane having a normal vector of $\vec{v}_R$ at a point moved from the right teeth landmark point by a third distance in the direction of $\vec{v}_R$; and,
    cutting the scan data into a plane having a normal vector of $\vec{v}_L$ at a point moved from the left teeth landmark point by the third distance in the direction of $\vec{v}_L$.

22. The method of claim 21 further comprise:
  Including a non-transitory computer-readable storage medium having stored thereon at least one program comprising commands, which when executed by at least one hardware processor, performs the method.

* * * * *